(12) United States Patent
Jover

(10) Patent No.: US 10,368,239 B2
(45) Date of Patent: *Jul. 30, 2019

(54) METHOD AND APPARATUS FOR PROVIDING BROADCAST CHANNEL ENCRYPTION TO ENHANCE CELLULAR NETWORK SECURITY

(71) Applicant: AT&T Intellectual Property I, L.P., Atlanta, GA (US)

(72) Inventor: Roger Piqueras Jover, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,816

(22) Filed: Aug. 28, 2017

(65) Prior Publication Data

US 2018/0007548 A1 Jan. 4, 2018

Related U.S. Application Data

(63) Continuation of application No. 14/834,107, filed on Aug. 24, 2015, now Pat. No. 9,749,854, which is a
(Continued)

(51) Int. Cl.
*H04W 12/04* (2009.01)
*H04L 9/08* (2006.01)
(Continued)

(52) U.S. Cl.
CPC ............. *H04W 12/04* (2013.01); *H04K 1/00* (2013.01); *H04K 3/22* (2013.01); *H04K 3/25* (2013.01);
(Continued)

(58) Field of Classification Search
CPC ........ H04W 12/04; H04W 12/02; H04K 3/00; H04K 3/22; H04K 3/25; H04K 3/42;
(Continued)

(56) References Cited

U.S. PATENT DOCUMENTS 4,554,668 A * 11/1985 Deman ................ H04B 7/2634
375/133
5,222,137 A * 6/1993 Barrett .................. H04L 9/0894
380/271
(Continued)

FOREIGN PATENT DOCUMENTS

EP 0167442 * 1/1986 ............... H04K 1/00
WO WO-0167442 A1 * 9/2001 ........... B29C 66/452

OTHER PUBLICATIONS

Study on Security Management Architecture for sensor Network based on intrusion detection. (Year: 2009).*
(Continued)

*Primary Examiner* — Dant B Shaifer Harriman

(57) ABSTRACT

A method, computer-readable storage device and apparatus for encrypting a broadcast message of a base station are disclosed. For example, the method selects an encryption key for the broadcast message and encrypts the broadcast message using the encryption key to create an encrypted broadcast message. The method then transmits an identifier of the encryption key and transmits the encrypted broadcast message over a broadcast channel. A method for decrypting a broadcast message that is encrypted is also disclosed.

20 Claims, 8 Drawing Sheets

Related U.S. Application Data continuation of application No. 14/085,688, filed on Nov. 20, 2013, now Pat. No. 9,119,064.

(51) Int. Cl.
| | |
|---|---|
| *H04W 12/02* | (2009.01) |
| *H04K 1/00* | (2006.01) |
| *H04K 3/00* | (2006.01) |
| H04L 29/06 | (2006.01) |
| H04W 12/12 | (2009.01) |

(52) U.S. Cl.
CPC .............. *H04K 3/42* (2013.01); *H04K 3/45* (2013.01); *H04K 3/65* (2013.01); *H04K 3/827* (2013.01); *H04L 9/0819* (2013.01); *H04W 12/02* (2013.01); *H04K 2203/16* (2013.01); *H04L 63/0428* (2013.01); *H04L 2209/80* (2013.01); *H04W 12/12* (2013.01)

(58) Field of Classification Search
CPC ............ H04K 3/45; H04K 3/65; H04K 3/827; H04K 2203/16; H04L 9/0819
USPC ....................................................... 380/270
See application file for complete search history.

(56) References Cited

U.S. PATENT DOCUMENTS

| | | | | |
|---|---|---|---|---|
| 5,325,432 A | * | 6/1994 | Gardeck | H04L 9/0833 380/271 |
| 5,812,955 A | * | 9/1998 | Dent | H04W 12/06 380/37 |
| 5,850,444 A | * | 12/1998 | Rune | G06Q 20/027 705/79 |
| 6,430,395 B2 | * | 8/2002 | Arazi | H04M 1/725 370/347 |
| 6,792,112 B1 | * | 9/2004 | Campbell | H04K 1/00 380/270 |
| 6,832,314 B1 | * | 12/2004 | Irvin | H04L 1/0061 713/162 |
| 7,383,577 B2 | * | 6/2008 | Hrastar | H04L 63/1416 380/255 |
| 7,633,995 B1 | | 12/2009 | Giallorenzi | |
| 8,024,000 B2 | * | 9/2011 | Wang | H04W 8/20 455/561 |
| 8,281,388 B1 | * | 10/2012 | Sobel | G06F 21/78 713/194 |
| 8,369,530 B2 | * | 2/2013 | Macaulay | H04L 63/0853 380/270 |
| 8,391,493 B2 | | 3/2013 | Li et al. | |
| 8,462,951 B2 | | 6/2013 | Steer et al. | |
| 8,732,805 B2 | * | 5/2014 | Kavantzas | G06F 21/335 380/270 |
| 8,838,971 B2 | * | 9/2014 | Brusilovsky | H04W 4/90 713/170 |
| 2008/0081651 A1 | * | 4/2008 | Kuroda | H04L 1/1829 455/509 |
| 2009/0041247 A1 | * | 2/2009 | Barany | H04L 63/06 380/270 |
| 2010/0313025 A1 | | 12/2010 | Tsouri | |
| 2010/0316221 A1 | | 12/2010 | Tie et al. | |
| 2011/0231935 A1 | * | 9/2011 | Gula | H04L 43/028 726/25 |
| 2011/0255692 A1 | * | 10/2011 | Soliman | H04L 63/0492 380/270 |
| 2012/0201382 A1 | | 8/2012 | Thomasson et al. | |
| 2013/0248784 A1 | | 9/2013 | Zhang et al. | |

OTHER PUBLICATIONS

Smart Phone Attacks and Defenses.*
Security in Wireless Sensor Networks: Issues and Challenges (Year: 2006).*
Cryptographic Security Techniques for Wireless Networks.*
Lightfoot, Leonard E., et al. "Jamming-resilient subcarrier assignment for OFDMA based space-time coded systems." *Electra/Information Technology*, 2009. eit'09. IEEE International Conference on. IEEE, 2009.
Liu, Sisi, Loukas Lazos, and Marwan Krunz. "Thwarting control-channel jamming attacks from inside jammers." *Mobile Computing*, IEEE Transactions on 11.9 (2012): 1545-1558.

* cited by examiner

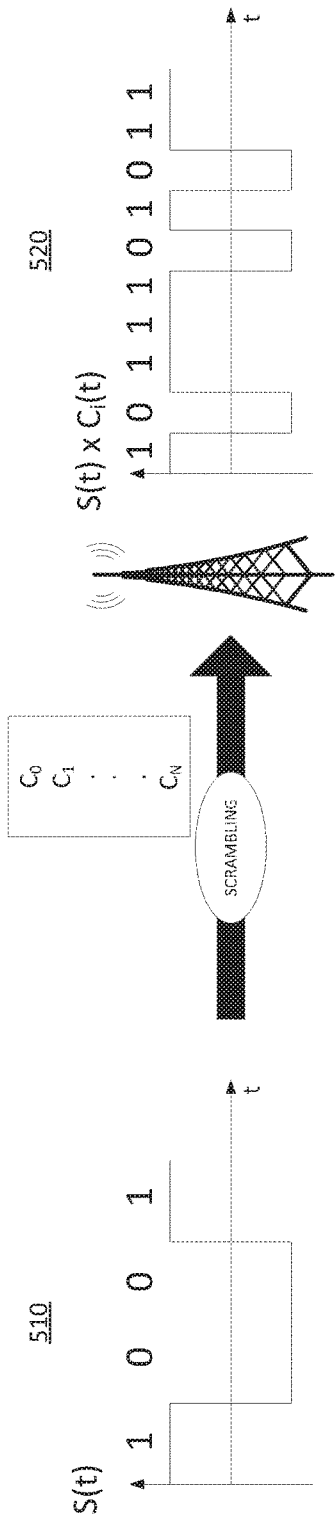
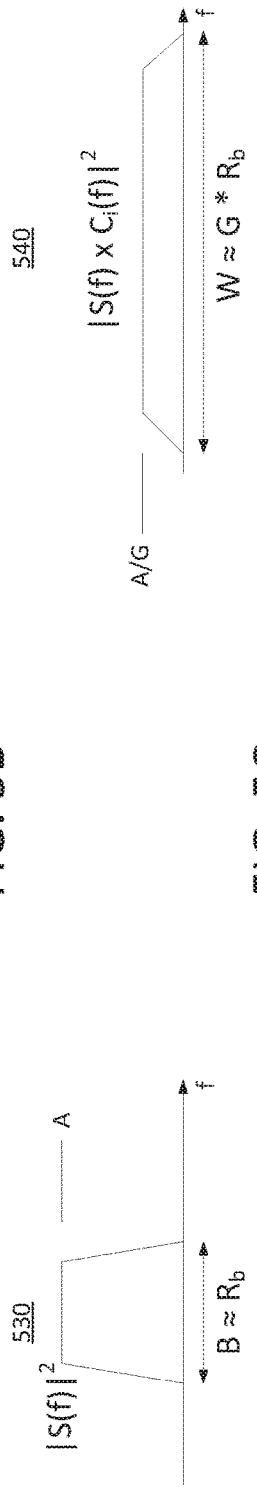
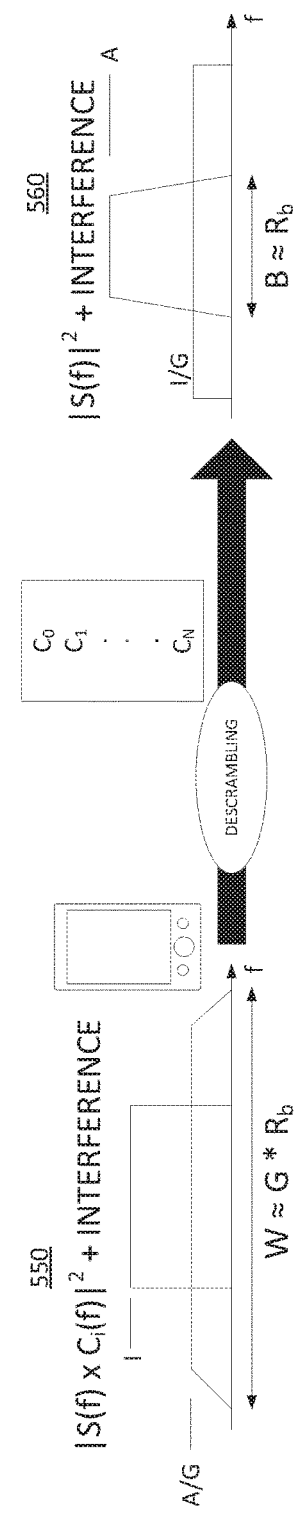

US 10,368,239 B2

METHOD AND APPARATUS FOR PROVIDING BROADCAST CHANNEL ENCRYPTION TO ENHANCE CELLULAR NETWORK SECURITY

This application is a continuation of U.S. patent application Ser. No. 14/834,107, filed Aug. 24, 2015, now U.S. Pat. No. 9,749,854, which is a continuation of U.S. patent application Ser. No. 14/085,688, filed Nov. 20, 2013, now U.S. Pat. No. 9,119,064, all of which are herein incorporated by reference in their entirety.

BACKGROUND

Long Term Evolution (LTE) offers enhanced capacity and coverage for current mobility networks, which experience a constant traffic increase and skyrocketing bandwidth demands. LTE is built upon a redesigned physical layer and based on an Orthogonal Frequency Division Multiple Access (OFDMA) modulation. LTE also features robust performance in challenging multipath environments and improves the performance of the wireless channel in terms of bits per second per Hertz (bps/Hz). Nevertheless, LTE remains vulnerable to radio jamming attacks.

SUMMARY

In one embodiment, the present disclosure describes a method, computer-readable storage device and apparatus for encrypting a broadcast message. For example, the method selects an encryption key for the broadcast message and encrypts the broadcast message using the encryption key to create an encrypted broadcast message. The method then transmits an identifier of the encryption key and transmits the encrypted broadcast message over a broadcast channel.

In another embodiment, the present disclosure describes a method, computer-readable storage device and apparatus for decrypting a broadcast message that is encrypted. For example, the method receives an identifier of an encryption key for the broadcast message and receives the broadcast message that is encrypted. The broadcast message is encrypted with the encryption key and is received over a broadcast channel from a base station. The method then retrieves the encryption key using the identifier of the encryption key and decrypts the broadcast message that is encrypted using the encryption key.

BRIEF DESCRIPTION OF THE DRAWINGS

The teaching of the present disclosure can be readily understood by considering the following detailed description in conjunction with the accompanying drawings, in which:

FIG. 5A illustrates an example of encrypting a broadcast message using an encryption key, according to embodiments of the present disclosure;

FIG. 5B illustrates frequency domain representations of the broadcast message of FIG. 5A before and after encryption, according to embodiments of the present disclosure;

FIG. 5C illustrates an example of decrypting the broadcast message of FIGS. 5A and 5B during a radio jamming attack, according to embodiments of the present disclosure;

To facilitate understanding, identical reference numerals have been used, where possible, to designate identical elements that are common to the figures.

DETAILED DESCRIPTION

Figure 1:
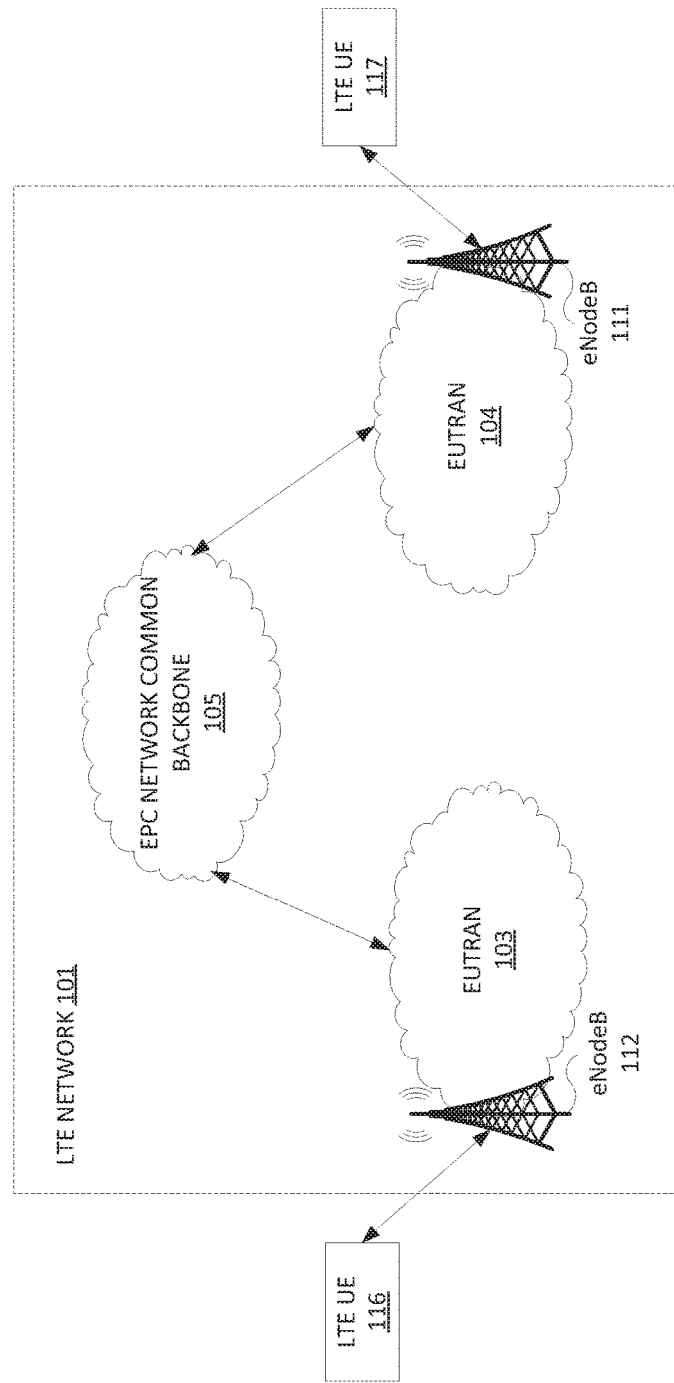
FIG. 1 illustrates an exemplary network related to the present disclosure.

Embodiments of the present disclosure relate to detecting jamming attacks on a cellular network and techniques to minimize the effects of such jamming attacks. The present disclosure broadly describes methods, computer-readable storage devices and apparatuses for encrypting and decrypting cellular network broadcast messages. Although the present disclosure is discussed below in the context of exemplary LTE networks and evolved uniform terrestrial radio access networks (eUTRANs), the present disclosure is not so limited. Namely, the present disclosure can be applied to communication networks in general, e.g., general packet radio service (GPRS) networks, Universal Mobile Telecommunications System (UMTS) networks, uniform terrestrial radio access networks (UTRANs), Global System for Mobile Communications (GSM) networks, and the like, where at least one cellular access network is available.

In one embodiment, the present disclosure describes a method for encrypting cellular network broadcast messages to prevent or deter radio jamming attacks. For example, jamming attacks generally involve transmitting radio signals to disrupt communications between cell sites and mobile devices and to decrease the signal-to-noise ratio. For an LTE base station, or eNodeB, this can cause LTE communications to fall back to GSM mode, which is less secure and allows a number of exploits to be used to intercept traffic, steal credentials, and so forth. In particular, the GSM encryption is weaker than the LTE standards. In addition, a successful jamming attack on LTE communications does not necessarily need high power, and can be focused on essential LTE control channels if these are known, e.g., saturating a paging channel.

In LTE networks, initial system and network configuration information is transmitted over the air in a master information block (MIB) over the physical broadcast channel (PBCH). For example, synchronization sequences and the PBCH are typically transmitted on the central 1.08 MHz of the frequency band utilized by a base station. Thus, an endpoint device attempting to connect to the base station can always find the configuration information by listening on the 1.08 MHz frequency band surrounding the center frequency. It should be noted that a similar technique is used in GSM and UMTS networks. In addition, the configuration information typically identifies which particular frequencies, physical resource blocks (PRBs) and/or other resources are assigned various other control channels. For example, the MIB transmitted on the PBCH identifies PRBs of a physical downlink shared channel (PDSCH) assigned to system information block (SIB) messages. The SIB messages, e.g., a SIB-1 message and a SIB-2 message, contain further system configuration information. However, to find the SIB messages, the MIB must first be read. Nevertheless, since the MIB, as well as the SIB-1 and SIB-2 messages, are transmitted unencrypted, any device listening can receive the configuration information contained in each of these broadcast messages. Thus, an attacker may easily obtain the configuration information and then use the configuration information to target particular control channels in a radio jamming attack. By concentrating the attack on one or more control channels, e.g., by focusing the power of the jamming signal on the one or more control channels, the range of the attack can be increased substantially. For example, the attack may cover an entire sector of a cell using off-the-shelf jamming equipment. In addition, the configuration information contained in the MIB and/or SIB messages can be used to prepare and execute other types of attacks, such as setting up a rogue base station or launching a signaling-based distributed denial of service (DDoS) attack against an LTE core network.

Accordingly, in one embodiment the present disclosure encrypts a broadcast message containing configuration information that is transmitted on a broadcast channel of a base station. Thus, only trusted endpoint devices having a key to decrypt the broadcast message are able to obtain the configuration information. In one embodiment, a set of keys are provided securely to trusted endpoint devices and are stored such that the keys are not accessible from the user space, e.g., stored on a trusted platform module (TPM). In addition, in one embodiment, a same set of keys is provided to one or more base stations. As such, a base station may select a key to use to encrypt a broadcast message and transmit, in the clear and over the air, an identifier of which encryption key was used. The base station may then also transmit the broadcast message in encrypted form. A trusted endpoint device receiving the identifier of the encryption key may therefore decrypt the broadcast message by looking up the correct encryption key based upon the identifier. On the other hand, an attacker's device which may receive the identifier of the encryption key, but the information is useless without the corresponding stored key that is associated with the identifier.

In another embodiment, the present disclosure applies a spreading sequence to a broadcast message to create a spread-spectrum broadcast message. For instance, an attacker that does not have a key to decrypt the broadcast message may nevertheless attempt to concentrate an attack on the central carrier frequencies (e.g., the central 1.08 MHz in LTE) which contains the initial configuration information. In other words, the attack is attempting to prevent devices from receiving even the initial configuration information such as a PSS, SSS, PBCH/MIB and so forth. Thus, by utilizing a spreading sequence, the central frequencies containing configuration information on control channels and in broadcast messages are made resilient to jamming attacks. In still another embodiment, the spreading sequence comprises an encryption key that is shared between the base station and trusted devices in the same manner described above. Thus, in this example, an attacker is prevented from obtaining initial configuration information and is also thwarted from attacking the carrier frequencies of the initial configuration information with a radio jamming signal.

The present disclosure also provides an embodiment that from time to time also reassigns control channels and/or broadcast messages to different PRBs/subcarriers, resource blocks (RBs), and the like. Advantageously, this prevents an attacker from deducing the resource assignment(s) and directing a jamming signal to the corresponding frequencies/sub-carriers. Moreover, in one embodiment the present disclosure provides multiple encryption keys such that a base station may randomly select a key and change keys either periodically, randomly or in response to a detection of a suspected attack. Thus, an attacker would need to extract encryption/decryption keys from the trusted platform module (TPM) in order to maintain a successful attack over time. These and other features of the present disclosure are discussed in greater detail below in connection with the discussion of FIGS. 1-8.

To further aid in understanding, the following provides a brief overview of common terms and technologies related to the present disclosure. Broadly defined, 3GPP is a global effort to define a wireless communication system specification. 2G refers to a second generation cellular network technology, 3G refers to a third generation cellular network technology, and 4G is a fourth generation cellular network technology. GSM is an example of a 2G cellular technology and a Universal Mobile Telecommunications System (UMTS) is an example of a 3G cellular network technology. In accordance to the 3GPP global effort, a General Packet Radio Service (GPRS) refers to a communications service used to transfer data via a cellular network. GPRS is available to users of a 2G cellular system, e.g., GSM. The GPRS provides an enhancement to the GSM system so that data packets are supported. In addition, in 3GPP release 8, LTE is provided as a set of enhancements to the UMTS. The enhancement focuses on adopting 4th Generation (4G) mobile communications technology to include an all Internet Protocol (IP) end-to-end networking architecture. LTE is an example of a 4G cellular network technology.

A base station for a 2G network is also referred to as a base transceiver station (BTS). A base station in a 3G network is also referred to as a Node B. At a particular time period, a particular base station in a 3G wireless network is controlled by a radio network controller (RNC). If at a later time period, another radio network controller is selected to control the traffic traversing through the particular base station, the particular base station is said to be re-homed to the later radio network controller. Similarly, at a particular time period, each base station in a 2G wireless network is controlled by a base station controller (BSC). For a 4G network, a radio base transceiver station (RBS), as per the 3GPP standards, is referred to as an eNodeB (or simply as a base station). An eNodeB for a 4G network provides an LTE-air interface and performs radio resource management for wireless access. It should be noted base stations in accordance with other network protocols or standards are within the scope of the present disclosure.

The radio network controllers and base station controllers route calls from user endpoint devices towards their destination via the service provider's core network. Similarly, calls destined to the user endpoint devices traverse the core network to reach a radio network controller (for 3G), a base station controller (for 2G) or an eNodeB (for 4G). As applicable, the radio network controllers, base station controllers and eNodeBs forward the calls towards their intended user endpoint device.

In one embodiment, a base station for a wireless network may be deployed with one or more sets of directional antennas that cover a predetermined portion of the 360 degree angle. A portion of a wireless network that is covered with one set of directional antennas is referred to as a sector. For example, if there are three sets of directional antennas at a base station, each set of directional antennas covers 120 degrees, thereby resulting in three sectors. The exemplary base station may also be referred to as a three sector base station. In general, the coverage of a sector is 360 degrees divided by the number of sectors of the base station. However, other configurations are possible, e.g., where some sectors have greater coverage than others.

In one embodiment, e.g., in a 2G/GSM network, each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors above may use one third of available frequency resources. Adjacent sectors use different frequency ranges. The channels for adjacent sectors are then assigned in mutually exclusive frequency ranges such that interference is minimized. However, in another embodiment, e.g., in a code division multiple access (CDMA) network or in an orthogonal frequency division multiple access (OFDMA) network (e.g., a 4G/LTE network), each cell and each sector may utilize all of the available frequency resources. In other words each cell and/or each sector reuses the same frequency resources.

FIG. 1 illustrates an exemplary network 100 related to the present disclosure. In one illustrative embodiment, the network 100 comprises an LTE network 101 and user endpoint devices 116 and 117.

The user endpoint devices 116 and 117 can be a smart phone, a cellular phone, a computer or laptop, a computing tablet, or any mobile endpoint communication devices equipped with wireless capabilities.

The LTE network 101 may comprise access networks 103 and 104 and a core network 105. In one example, each of the access networks 103 and 104 comprises an evolved Universal Terrestrial Radio Access Network (eUTRAN). In one example, the core network 105 comprises an Evolved Packet Core (EPC) network.

The eUTRANs are the air interfaces of the 3GPP's LTE specifications for mobile networks. Namely, the eUTRAN comprises a radio access network standard that will replace previous generations of air interface standards. All eNodeBs in the eUTRANs 103 and 104 are in communication with the EPC network 105. The EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards.

In operation, LTE user equipment or user endpoint (UE) 116 may access wireless services via the eNodeB 112 located in the eUTRAN 103. Similarly, the LTE UE 117 may access wireless services via the eNodeB 111 located in the eUTRAN 104. It should be noted that any number of eNodeBs can be deployed in an eUTRAN. In one illustrative example, the eUTRANs 103 and 104 may comprise one or more eNodeBs.

The above network 100 is described to provide an illustrative environment in which embodiments of the present disclosure may be employed. In other words, the network 100 is merely illustrative of one network configuration that is suitable for implementing embodiments of the present disclosure. Thus, the present disclosure may also include any other different network configurations that are suitable for implementing embodiments of the present disclosure, for conveying communications among endpoint devices, for conveying communications between endpoint devices and other components (e.g., core network and access network components), and so forth. Those skilled in the art will realize that the communication system 100 may be expanded by including additional endpoint devices, access networks, network elements, application servers, etc., or modifying or substituting those illustrated in FIG. 1, without altering the scope of the present disclosure.

Figure 2B:
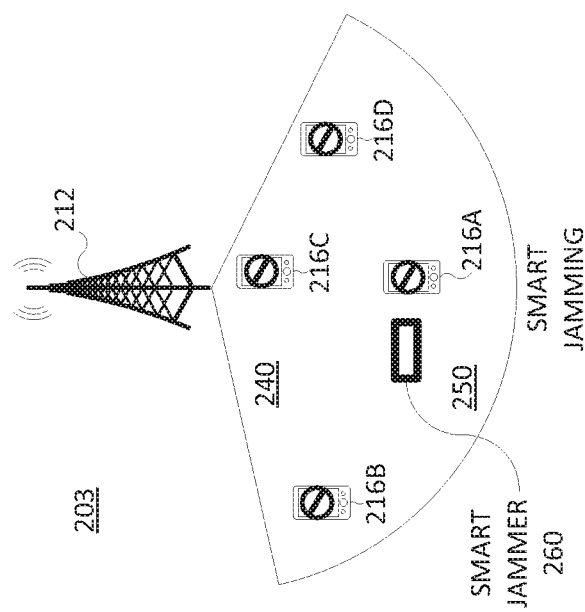
FIG. 2B illustrates an exemplary smart jamming attack on a base station sector.
Figure 2A:
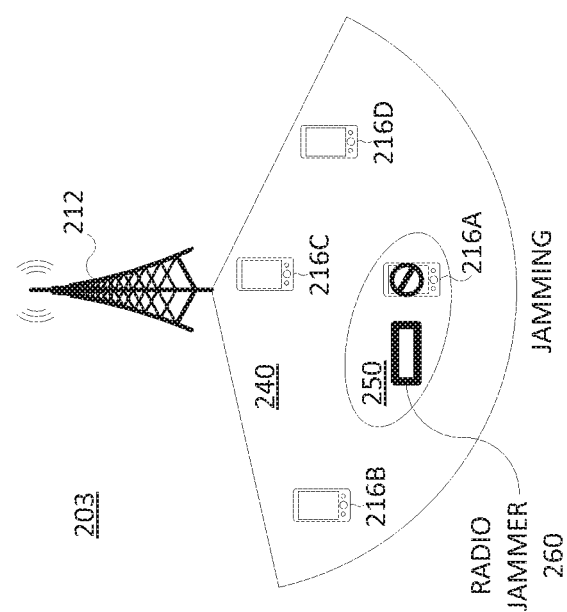
FIG. 2A illustrates an exemplary jamming attack on a base station sector.

To further aid in understanding the present disclosure, FIG. 2A illustrates a conventional jamming attack on a base station sector 240 of a cell 203. As illustrated in FIG. 2A, cell 203 comprises a base station 212 that is servicing endpoint devices 216A-216D in sector 240. In one embodiment, base station 212 comprises an eNodeB of an eUTRAN (e.g., a 4G network), or a NodeB of a UTRAN (e.g., a 3G network). As also illustrated in FIG. 2A, a radio jammer 260 is transmitting a jamming signal that covers an area 250. Notably, in a traditional jamming attack, the radio jammer transmits a jamming signal, typically random noise, over a broad range of frequencies to attempt to disrupt communication. However, to jam the entire frequency band often requires a considerable amount of power. For example, if radio jammer 260 comprises a typical endpoint device, such as a cellular phone or cellular-enabled laptop computer, or even a more expensive jamming device, at full power the radio jammer 260 may still only be capable of jamming a small area 250 surrounding the radio jammer 260. In this example, endpoint device 216A is within area 250 and thus is jammed by the signal from radio jammer 260. In one example, the jamming causes the signal-to-noise ratio (SNR), the signal-to-interference-and-noise (SINR) ratio and/or the received signal strength indication (RSSI) experienced by endpoint device 216A (and any other device in the area 250 affected by the jamming) to drop. Alternatively or in addition, the jamming may cause the bit-error rate (BER) experienced by endpoint device 216A to increase. In another embodiment, the jamming may cause a drop in traffic volume from a base station to be observed in a core network, while the base station still appears to be operational.

As a further consequence, as noted above jamming may cause 4G/LTE or 3G communications to deteriorate to the point where an endpoint device and/or base station may fall back on to 2G/GSM communications. Thus, in this example, endpoint device 216A may attempt to communicate with the base station 212 via GSM during the jamming attack. For example, the base station 212 may include components to support legacy GSM communications as a backup, or as an alternative to 3G, 4G and/or LTE. However, GSM communications are widely considered to have weak encryption standards and are subject to known exploits for base station spoofing, sniffing attacks, phishing attacks and so forth. In this regard, it should be noted that even if the base station 212 does not support 2G/GSM communication, an attacker may set up a femtocell or 2G base station (e.g., a base transceiver station (BTS)) that appears to be a legitimate base station from the perspective of the endpoint device 216A. For example the attacker may use the same device, e.g., radio jammer 260, for radio jamming as well as for providing a rouge base station. If the endpoint device 216A can be forced or tricked into connecting to the rouge base station, the attacker can then implement a number of further exploits. It should be noted that several examples herein describe attacks on 3G and/or 4G/LTE base stations, where 2G/GSM components comprise a backup infrastructure. Nevertheless, the present disclosure may also be applied to attacks on cellular base stations that employ various different types of technology, including 2G/GSM infrastructure.

FIG. 2B illustrates a more advanced jamming attack on a base station sector 240, referred to herein as "smart jamming". In particular, the cell 203, base station 212, sector 240 and endpoint devices 216A-216D may comprise the same devices and areas shown in FIG. 2A. However, in this case the radio jammer 260 illustrated in FIG. 2B comprises a smart jammer. Notably, the radio jammer 260 concentrates the jamming signal and power output over one or more specific and targeted frequencies, or over a narrower range of frequencies as compared to the radio jammer 260 in FIG. 2A. Thus, in FIG. 2B, the area 250 affected by the jamming signal is much larger and can include the entire range of sector 240, e.g., when the attack targets uplink signaling channels. As such, all of endpoint devices 216A-216D are affected. For example, a typical endpoint device, such as a cellular telephone or laptop computer, may be capable of jamming both uplink and downlink control channels used for 3G/LTE call establishment and maintenance using off-the-shelf components or with only small upgrades or enhancements to the radio resources, e.g., an amplifier, range extender and so forth. For example, a smart jamming attack may target the physical broadcast channel (PBCH) and/or master information block (MIB) which has assigned physical resource blocks (PRBs) which are known in advance and are always mapped to the central 72 subcarriers of the OFDMA signal. Similarly, a smart jamming attack may target the physical downlink control channel (PDCH or PDCCH), the physical uplink control channel (PUCH or PUCCH), the physical random access channel (PRACH), the primary synchronization signal (PSS), the secondary synchronization signal (SSS), a system information block (SIB), and so forth.

It should be noted that LTE includes physical channels as well as logical channels, and that control channels may be physical control channels or logical control channels. The most straightforward smart jamming attack will target the physical control channels occupying defined frequencies/wavelengths. For example, an attacker can target the PSS, SSS, PBCH and/or MIB by transmitting a jamming signal on the central 72 subcarriers of the OFDMA signal. However, logical control channels may also be targeted if the attacker knows the timing of the logical control channel. For example, a physical random access channel (PRACH) may comprise time slot assignments on different PRBs/subcarriers. Thus, the smart jamming may target the assigned subcarriers with a noise signal synchronized to the timing of the particular control channel's slot assignments.

In any case, by targeting specific channels/frequencies used for conveying signaling information for call establishment, the radio jammer 260 can effectively disrupt all communications. A successful smart jamming attack allows the attacker to utilize all of the same exploits available with regular (broadband) jamming, but affords a greater range. In addition, the cell tower itself may be affected while allowing the radio jammer 260 to be located a safe distance away, e.g., where the attacker can remain concealed or anonymous, if the attacker is using, for example, a directional antenna pointed to the eNodeB. In other words, the attacker may effectively locate the radio jammer 260 anywhere in the sector 240, while being able to affect all or most of the endpoint devices in the sector 240 as well as the equipment of base station 212 that services the sector 240.

Figure 3:
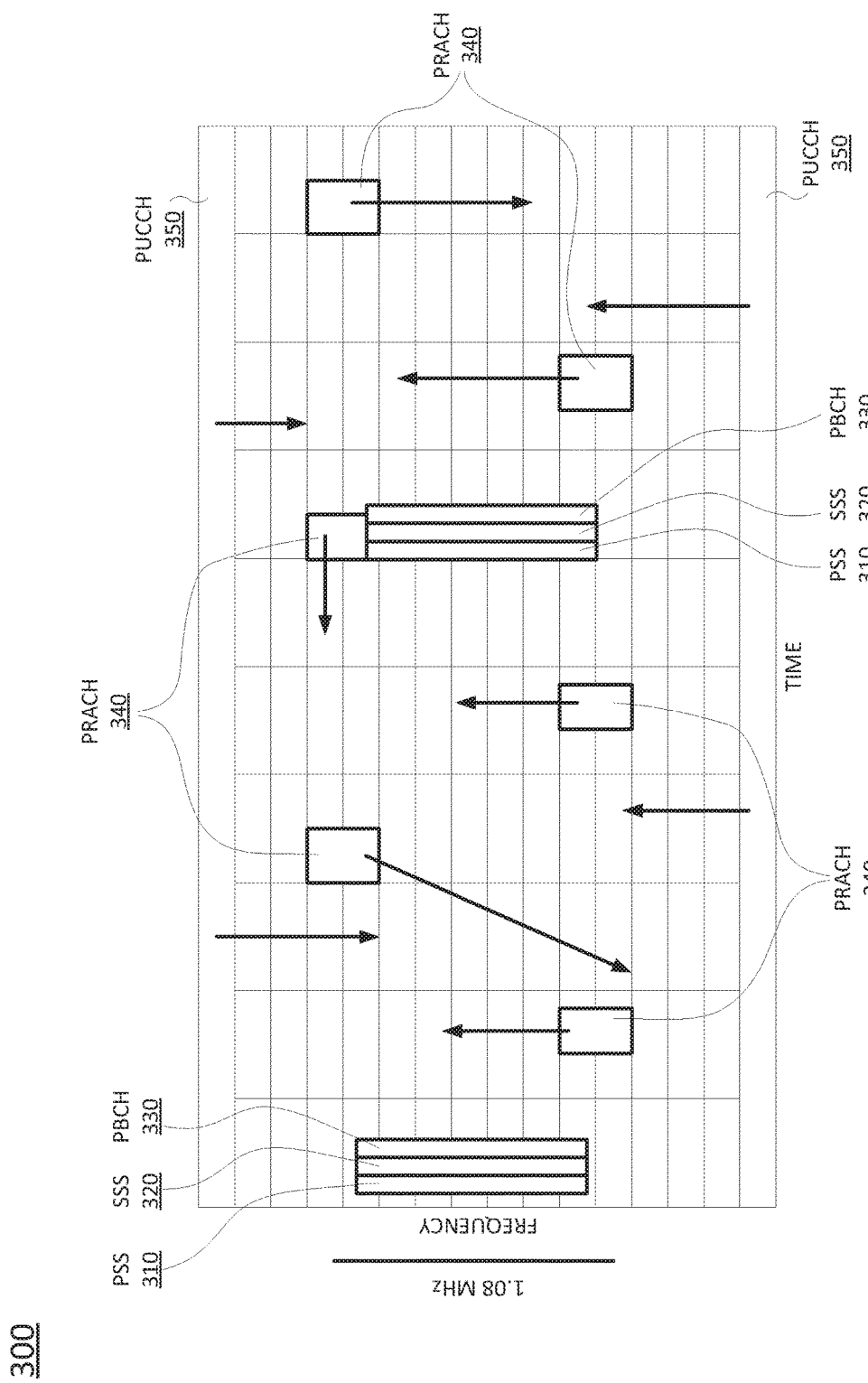
FIG. 3 illustrates an orthogonal frequency division multiple access frame structure, according to embodiments of the present disclosure.

To further aid in understanding the present disclosure, FIG. 3 illustrates an exemplary LTE frame 300. The frame 300 includes physical resource blocks (PRBs), which correspond to the rows, and sub-frames, which are the columns. In LTE, each PRB comprises a block of 12 sub-carriers (frequencies) and seven symbols time duration. The duration of each sub-frame is 1 ms and includes two time slots. Thus, there are 14 symbols per sub-frame. There are 10 sub-frames per frame, for a frame duration of 10 ms.

LTE base stations transmit a primary synchronization sequence (PSS) 310 and a secondary synchronization sequence (SSS) 320 every first and sixth sub-frame on the central 6 PRBs to allow endpoint devices to synchronize to the base station. In addition, a physical broadcast channel (PBCH) 330 containing essential configuration information, such as a master information block (MIB) follows the PSS 310 and SSS 320 of every first sub-frame of a frame (e.g., the first four symbols of slot 1, sub-frame 0 of every radio frame). Thus, an endpoint device attempting to connect to the base station can synchronize to the PSS 310 and/or SSS 320 within 5 ms by determining the direct current (DC), or center frequency of the signal transmitted from the base station and then listening on the 1.08 MHz frequency band surrounding the center frequency.

Once synchronized to the PSS 310 and/or SSS 320, the endpoint device can obtain the MIB information contained on the PBCH 330 to obtain the configuration information. For example, the MIB may include the system frame number, the downlink bandwidth, e.g., a number of PRBs, and the physical hybrid ARQ indicator channel (PHICH) configuration. Once the endpoint device determines the PHICH configuration, the endpoint device is able to access the PHICH and obtain further configuration information, e.g., one or more system information block (SIB) messages. For example, a SIB-1 and SIB-2 message may contain additional configuration information such as additional control channel PRB and/or sub-frame assignments and the like. For example, the SIB-1 message may include: mobile network code/mobile country code (MNC/MCC) information, a tracking area code (used to locate phones during a paging procedure) and a cell identifier. In addition, a SIB-2 messages may contain the configuration of the physical random access channel (PRACH) 340, the configuration and operation of the paging channel (PCCH) as well as the structure of the uplink and downlink resources for user data transmission, e.g., the physical uplink shared channel (PUSCH) and the physical uplink control channel (PUCCH) 350, the values of network timers, e.g., a timer to disconnect a radio access bearer (RAB), and other timers. The example of FIG. 3 is provided as just one illustration of an exemplary environment in which broadcast messages may be transmitted and received in a cellular network. In other words, the present disclosure is equally applicable to broadcast messages in other types of networks, such as a 3G network, a 2G/GSM network, and so forth.

Figure 4:
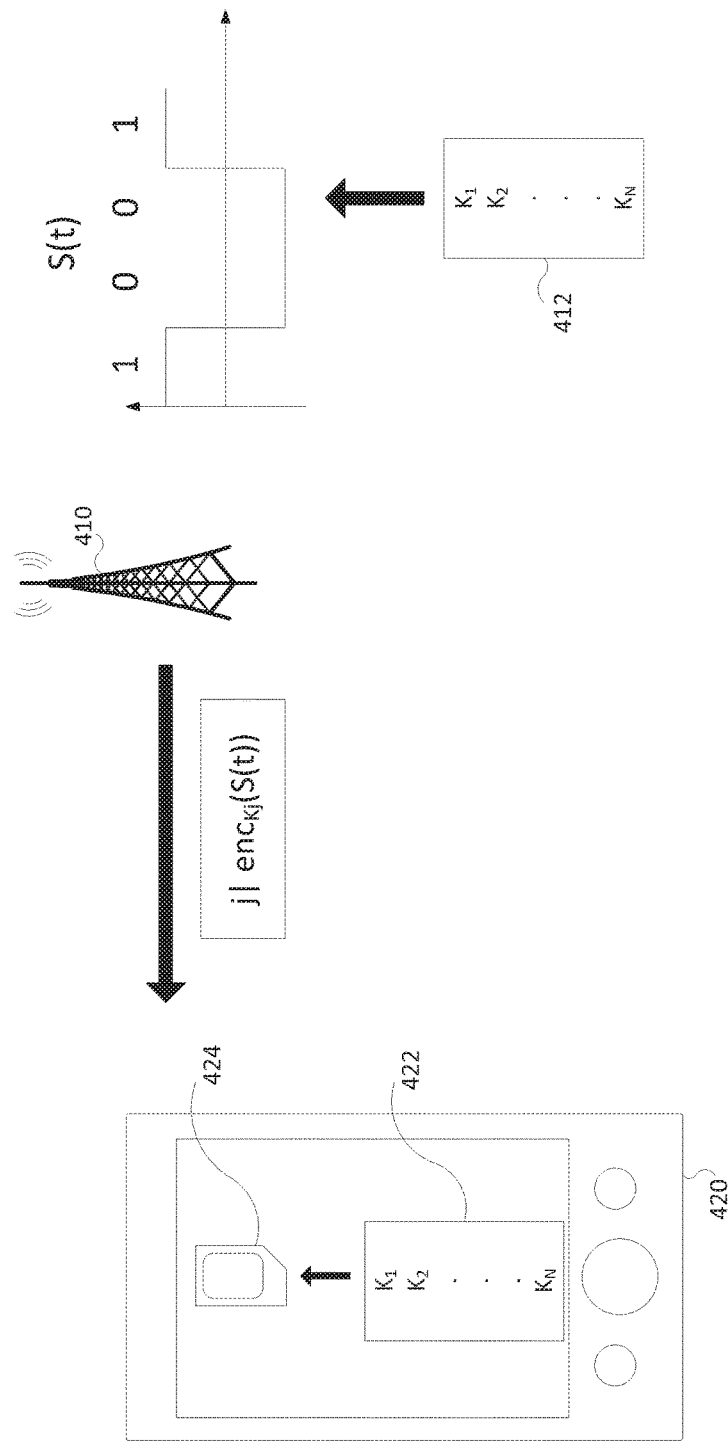
FIG. 4 illustrates a system for encrypting a broadcast message, according to embodiments of the present disclosure.

To further aid in understanding the present disclosure, FIG. 4 illustrates an exemplary system 400 for encrypting a broadcast message. On the network side, a base station 410, or other network component, such as home subscriber server (HSS) in an EPC network, stores a set 412 of N encryption keys in a secure location. Similarly, a trusted platform module (TPM) 424 in an endpoint device 420 stores securely a set 422 of N keys, e.g., the same set of keys as set 412. The value of N can be arbitrarily large. In one embodiment, a secret master key K is used to generate the set of N keys. Based on the initial secret key K, in one embodiment each sub-key $K_j, j=1, \ldots, N$ is then generated as $K_j = H(K|_j)$, H being a hash function and "|" a concatenation operation. Assuming a robust hash function, eventual leakage of a sub-key $K_j$ would not provide an attacker any information on the actual secret master key K.

In one embodiment, the base station 410 then selects a key $K_j$ with id j from the set 412 to use in encrypting a broadcast message that is to be transmitted on a control channel of the base station. For example, the base station 410 may be encrypting a master information block (MIB) message transmitted on a physical broadcast channel (PBCH), a SIB-1 message, a SIB-2 message and so forth. The base station 410 then encrypts the broadcast message, represented as S(t), with the key $K_j$, and transmits the encrypted broadcast message over the air. Notably, in one embodiment the base station 410 also transmits the identifier of the key, j, unencrypted over the air. As illustrated in FIG. 4, the base station 410 transmits a stream comprising j|enc$_{K_j}$(S(t)), where j is the unencrypted/plain text version of the key identifier and enc$_{K_j}$(S(t)) is the encrypted version of the physical broadcast channel.

Accordingly, in one embodiment after receiving the unencrypted identifier of the encryption key, j, the endpoint device 420 can perform a look-up using the identifier of the encryption key. For example, the endpoint device may store the set of keys 422 in a trusted platform module (TPM) 424. For instance, in one embodiment TPM 424 comprises a hardware space of a cellular modem or another storage area that is not accessible from a user space of the endpoint device 420. However, in another embodiment the set of keys 422 may be stored in a SIM card. In any case, the endpoint device 429 may simply retrieve the key $K_j$ corresponding to the (unencrypted) identifier, j. Then, the endpoint device 420 can decrypt the encrypted stream j|enc$_{K_j}$(S(t)).

Note that the identifier j is freely available to any attacker that is listening. However, the attacker would still not be able to know the key $K_j$ that is being used to encrypt the broadcast message. In particular, the attacker may lack the mapping of j to $K_j$. In addition, the attacker does not have a copy of $K_j$. Nevertheless, if at any point the key $K_j$ is compromised, the base station 410 would still be able to switch to a different key, $K_{j+1}$, and continue operating normally. For example, in one embodiment a broadcast message may be sent over a control channel to all of the endpoint devices serviced by base station 410, to alert the endpoint devices of the change in encryption key. Incoming connections, either via handovers from other cells or for new endpoint devices being turned on, would just receive the updated broadcast messages, e.g., i|encK$_i$(S(t)), and continue operating normally. Furthermore, in one embodiment a network could choose to use a different key at each base station/sector. Thus, if an attacker managed to compromise an encryption key, a potential attack during the time it would take the network to change to a new key would be localized and only impact one cell or sector.

To further aid in understanding the present disclosure, FIG. 5A illustrates an example of spread spectrum encoding and decoding of a data stream S(t), e.g., a broadcast message and/or control channel. Henceforth, for illustrative purposes S(t) will be referred to a broadcast message. However, it should be noted that insofar as broadcast messages may be conveyed on control channels, e.g., a MIB on the PBCH, the present disclosure is equally applicable to operations on both broadcast message as well as on the control channels. For instance, a control channel may convey several broadcast messages. Thus, operations on the control channel may be applied to one, several or all of the broadcast messages on the control channel. In any case, as shown in FIG. 5A, a spreading sequence or scrambling sequence $C_i$(t) is applied to S(t) prior to transmission from a radio transmitter, e.g., a base station. For example, the base station may store a number, N, of spreading sequences $C_0$ to $C_N$ from which it may select particular one, $C_i$, to use as a spreading sequence for S(t). The transmission then comprises the broadcast message that has been spread by the spreading sequence, S(t)×$C_i$(t). In particular, the first graph 510 shows the data stream S(t) before spreading and the second graph 520 shows the data stream after spreading. The transmission is then received at a radio receiver, e.g., at a cellular endpoint device. In one embodiment, the endpoint device dispreads the stream using the same spreading sequence $C_i$(t) to obtain the original stream S(t) of the broadcast message.

FIG. 5B illustrates the frequency domain representation of the data stream S(t) of FIG. 5A. For example, the first graph 530 shows the spectrum S(f) of the data stream S(t) prior to spreading. The second graph 540 shows the spectrum after spreading. In one example, S(t) is a message with a duration of T seconds and containing M bits. Thus, the bit rate is W/T=$R_b$ in bits-per-second. The bandwidth, B, is proportional to the bit rate $R_b$ and is illustrated in the graph 530. The amplitude, A, of S(f) is also shown in graph 530. Notably, the power is related to the area of the square of S(f). Turning to graph 540, the bandwidth, W, of the spread spectrum stream is proportional to G*$R_b$, where G is the spreading factor, also referred to as the chip rate or processing gain, of the spreading sequence $C_i$(t). Notably, the amplitude of the spread spectrum stream is A/G. However, while the power is related to |S(f)×$C_i$(f)|², the total power remains the same as before spreading, e.g., as shown in graph 530.

FIG. 5C illustrates a frequency domain representation of the reception and descrambling of the spread spectrum stream of FIGS. 5A and 5B that has been subject to interference, e.g., a jamming attack. As shown in graph 550 interference is generated with an amplitude, I, but with a bandwidth that is less than the bandwidth of the spread spectrum stream W≈G*$R_b$. The power of the spread spectrum stream as well as the interference is related to |S(t)×$C_i$(t)|²+interference power. As illustrated in FIG. 5C the spread spectrum stream and interference are then received by an endpoint device which applies the spreading sequence $C_i$(t) to descramble the received signals. Notably, after descrambling, the total power remains the same as illustrated in graph 560. However, the bandwidth of the interference is spread by a factor of G. In addition, the amplitude of the interference component is approximately I/G. On the other hand, the amplitude of the desired signal S(f) is A, with power concentrated in a narrower bandwidth B≈$R_b$. Thus, the interference is effectively filtered such that the desired signal S(f) (i.e., S(t)) can be received. For instance, although the receiver still receives the same high interference power (area), the receiver filters the received signal at a bandwidth of B. Therefore, the only interference power affecting the reception is the area of the interference within the bandwidth B, which is 1/G of the total interference power the attacker attempted to inject.

It should be noted that the example of FIGS. 5A-5C is useful for thwarting jamming attacks directed at a broadcast message and/or control channel even where the scrambling sequence $C_i$(t) is known. For instance, an attacker may simply attack a central 1.08 MHz utilized by a base station knowing that this frequency band typically contains control channels/broadcast messages. This can result in an effective denial-of-service (DoS) attack, even if the attacker does not wish to obtain further control information to make more targeted attacks, e.g., on uplink control channels. However, in one embodiment, $C_i(t)$ may also comprise an encryption key, as described above in connection with FIG. 4. In other words, the encryption key $K_j$ mentioned in connection with FIG. 4 may comprise a scrambling sequence/spreading sequence $C_i(t)$ as described in connection with FIGS. 5A-5C. Thus, in the example of FIG. 4, the base station 410 may select an encryption key/scrambling sequence $C_i(t)$, encrypt and transmit the broadcast message S(t) using $C_i(t)$, and transmit an identifier of the scrambling sequence, i, unencrypted over the air. In turn, the endpoint device 420 can retrieve the encryption key/scrambling sequence $C_i(t)$ and decipher the received encrypted/scrambled broadcast message $S(t) \times C_i(t)$. Notably, this particular embodiment provides interference resilience of a broadcast message and/or control channel and further prevents an attacker who desires to engage in further and more targeted attacks from obtaining useful information from the broadcast message and/or control channel.

As mentioned above, in one embodiment, the present disclosure also modifies physical resource block (PRB) assignments of one or more control channels as a further deterrent to jamming attacks. For example, the PRB allocation of the physical uplink control channel (PUCCH) is typically known in advance as defined by the LTE standards. For example, the uplink control signaling on this channel is transmitted in a frequency region on the edges of the system bandwidth (see, for example, FIG. 3, which illustrates an exemplary assignment of the PUCCH 350). In addition, the PRB allocation of other essential uplink control channels, such as the physical random access channel (PRACH) 340, can be extracted from the system information block (SIB) messages.

Accordingly, one embodiment the present disclosure scrambles the PRB allocation of control channels so they cannot be the target of a jamming attack. For example, as illustrated in FIG. 3, one or more PRB assignments of the physical random access channel (PRACH) and/or the physical uplink control channel (PUCCH) may be reassigned to different PRBs. Advantageously, this prevents an attacker from deducing the resource assignment(s) and directing a jamming signal to the corresponding frequencies/sub-carriers. For example, an attacker listening to successive sub-carriers over an extended period of time may be able to determine a control channel is carried thereon based upon different patterns that may be observed. However, by changing the PRB assignments often, the attacker loses this route of attack. In addition, even if an attacker is able to deduce a particular control channel assignment and jam the corresponding sub-carriers and/or PRBs, the duration of the attack is minimized because the control channel is only affected until the next channel reassignment.

In addition, as mentioned above, in one embodiment a base station may change encryption keys from time to time, including circumstances where it has detected a potential jamming attack. Thus, even if an attacker is able to decipher broadcast messages at one time and obtain particular control channel assignments, the attacker is not necessarily able to continue to decipher the broadcast messages after the key is changed. Consequently, the base station may also alter the PRB assignments of one or more control channels, in addition to changing the encryption key. In this way, the base station may move control channels that may have been compromised away from targeted jamming signals.

Figure 6:
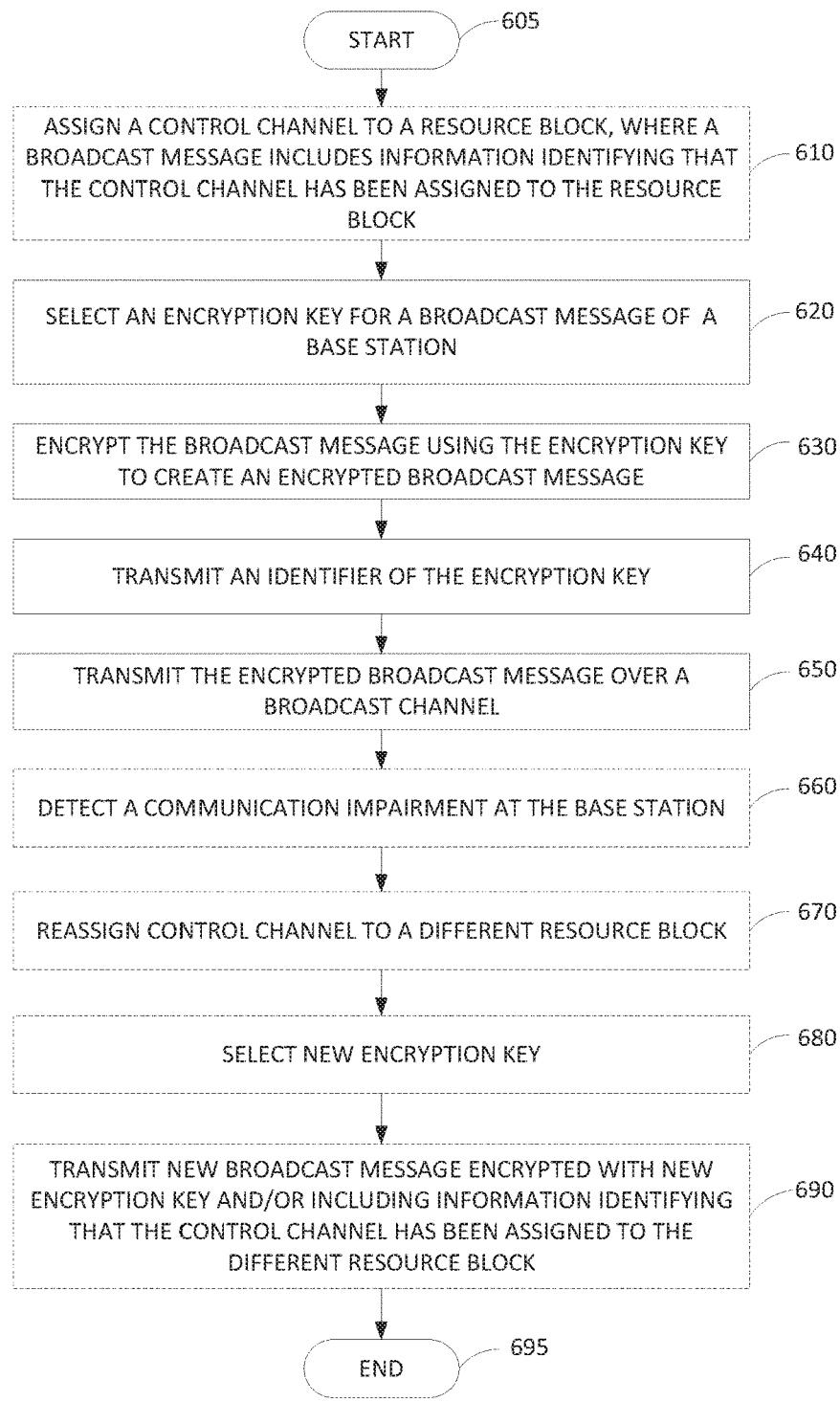
FIG. 6 illustrates a flowchart of a method for encrypting a broadcast message, according to embodiments of the present disclosure.

FIG. 6 illustrates a flowchart of a method 600 for encrypting a broadcast message of a base station. In one embodiment, the method 600 is performed by a base station such as illustrated in any of FIG. 1, 2, 4 or 5. For example, the base station may comprise a NodeB, an eNodeB, a base transceiver station (BTS), and so forth. Alternatively, or in addition, the steps, functions, or operations of method 600 may be performed by a computing device or system 800, and/or processor 802 as described in connection with FIG. 8 below.

Method 600 starts in step 605 and then proceeds to optional step 610 or to step 620. In optional step 610, the method 600 assigns at least one control channel to at least one available resource block. For example, the term control channel may broadly include broadcast channels (e.g., used for downlink control and configuration information) as well as other controls channels, e.g., a physical random access channel (PRACH), uplink control channels such as the physical uplink control channel (PUCCH), and so forth. As mentioned above, certain control channel assignments may be selected, and altered, based upon changing conditions. For instance, the method 600 may select certain resource blocks of an LTE frame to assign to a PRACH, a PUCCH, and so forth. However, the assignment(s) may change at a later time, e.g., due to a detection of a physical later attack, due to passage of time, and so forth. For example, the method 600 may change assignments once every hour, once every six hours, once per day, and so forth. Advantageously, this may deter an attacker from listening to certain sub-carriers/frequencies over an extended period of time to deduce that control information is contained thereon and to implement a targeted radio jamming attack. In one embodiment, the method transmits a broadcast message that includes the current resource block assignment(s) of the at least one control channel to enable trusted endpoint devices to utilize the control channel.

At step 620, the method 600 selects an encryption key for a broadcast message of the base station. For example, the method may be encrypting a master information block (MIB) message transmitted on a physical broadcast channel (PBCH), a SIB-1 message, a SIB-2 message and so forth. In one example, the encryption key may be selected from a set of encryption keys that are stored at the base station. However, in another example, the encryption key may be stored elsewhere, e.g., at a home subscriber server (HSS) or other cellular network component.

At step 630, the method 600 encrypts the broadcast message using the encryption key to create an encrypted broadcast message. For example, the method may be encrypting a master information block (MIB) message transmitted on a physical broadcast channel (PBCH), a SIB-1 message, a SIB-2 message and so forth. In one example, the encryption key comprises a spreading sequence. Thus, in one example, step 630 comprises spreading the broadcast message to create a spread-spectrum broadcast message using the encryption key as a spreading sequence.

At step 640, the method 600 transmits an identifier of the encryption key. For example, if the encryption key is one of several encryption keys stored in a set, each key may be identified sequentially as $K_1, K_2, \ldots, K_N$. Thus the identifier may comprise a label that identifies which particular key in the sequence is being used. In one embodiment, the identifier is transmitted unencrypted over the air. In addition, in one embodiment, the identifier may be transmitted on the same broadcast channel that is to be used to transmit the encrypted broadcast message. However, in another example, the identifier may be transmitted via a different broadcast channel, in another broadcast message that is unencrypted and so forth.

At step 650, the method 600 transmits the encrypted broadcast message over a broadcast channel. For example, if the method 600 is encrypting a master information block (MIB) message, it may transmit the MIB message over a physical broadcast channel (PBCH). Similarly, if the encrypted broadcast message comprises a system information block (SIB) message, the method 600 may transmit the encrypted broadcast message in the PRBs which are assigned to the SIB (i.e., the "broadcast channel" for the SIB). In one embodiment, the identifier of the encryption key and the encrypted broadcast message are transmitted on the same broadcast channel.

Notably, a trusted endpoint device that is communicating with the base station or that is attempting to establish communications with the base station may successfully decrypt the encrypted broadcast message by looking up the encryption key using the identifier transmitted at step 640. For example, a trusted endpoint device may store a corresponding set of encryption keys in a trusted platform module (TPM) which may be provided by a device manufacturer and/or cellular network provider. However, an attacker without a trusted endpoint device can only receive the identifier transmitted at step 640, but will not have access to the corresponding key. In addition, even of an attacker has a trusted device with a set of encryption keys, the encryption keys may be separated from the user space such that the attacker still cannot use the keys to obtain system configuration information contained in the encrypted broadcast message.

Following step 650 the method may proceed to step 695 where the method ends, or may proceed to optional step 660. At optional step 660, the method 600 detects a communication impairment at the base station. For example, the method may determine that there is a substantial drop in traffic, the bit error rate (BER) may increase greater than a certain percentage, the signal-to-noise ratio (SNR) may decrease, a received signal strength indicator (RSSI) may decrease, and so forth. In addition, the changes to these various conditions may be indicative of a physical layer attack, e.g., a radio jamming attack. In one embodiment, the method 600 may detect an attack on a particular control channel (e.g., on the sub-carriers/frequencies of resource blocks which are presently associated with a control channel). For example, the method may monitor the physical random access channel (PRACH) to observe a change in the SNR. Similarly, the method may separately monitor a plurality of other control channels in the same manner. However, in another embodiment step 660 may simply detect a general communication impairment at the base station which may be indicative of a radio jamming attack.

At optional step 670, the method 600 may reassign a control channel (e.g., a broadcast channel or other control channel, such as an uplink control channel) to a different resource block, e.g., in response to the detection of a potential radio jamming attack at optional step 660. For example, as mentioned above, this may prevent an attacker from deducing the resource assignment(s) and directing a jamming signal to the corresponding frequencies/sub-carriers associated with the control channel.

At optional step 680, the method 600 may also select a new encryption key. For example, step 680 may be performed in response to the detection of a communication impairment at optional step 660. As mentioned above, if an encryption key has been compromised, an attacker may then be able to determine the assignments of one or more control channels to various resource blocks based upon control information contained in a broadcast message. However, by changing keys at step 680, the attacker will be prevented from tracking any control channel reassignments that may have been made at optional step 670.

At optional step 690, the method 600 transmits a new broadcast message that is encrypted with the new encryption key. In addition, in one embodiment at step 690 the method 600 may further transmit the new encryption key identifier that is selected at optional step 680. For example, the new encryption key identifier may be transmitted on the same broadcast channel in unencrypted form preceding the new broadcast message that is encrypted. In addition, in one embodiment, the new broadcast message includes information that identifies that a control channel has been assigned to a different resource block. In particular, step 690 may convey information about the control channel reassignment of step 670. As such, trusted endpoint devices that are able to switch to the new encryption key selected at step 680 may track changes to any control channel configuration changes, whereas an attacker may no longer be able to carry out targeted attacks on the particular control channel(s) that have been reassigned.

Following any of steps 650-690, the method 600 proceeds to step 695 where the method ends.

Figure 7:
FIG. 7 illustrates a flowchart of a method for decrypting a broadcast message, according to embodiments of the present disclosure.

FIG. 7 illustrates a flowchart of a method 700 for decrypting a broadcast message of a base station. In one embodiment, the method 700 is performed by an endpoint device such as illustrated in any of FIG. 1, 2, 4 or 5. Alternatively, or in addition, the steps, functions, or operations of method 700 may be performed by a computing device or system 800, and/or processor 802 as described in connection with FIG. 8 below.

Method 700 starts in step 705 and then proceeds to step 710. In step 710, the method 700 receives an identifier of an encryption key for a broadcast message. For example, the identifier may be received over a broadcast channel (e.g., a control channel) of a base station. For instance, in one embodiment, the identifier may be received in a master information block (MIB) message or in a system information block (SIB) message. Alternatively, the identifier may be received before such messages or appended to such messages. For example, the identifier may precede a MIB that is transmitted over a physical broadcast channel (PBCH). In one example, the identifier is unencrypted.

At step 720, the method 700 receives from a base station over a broadcast channel the broadcast message that is encrypted using the encryption key. For example, in one embodiment the message that is encrypted may comprise an encrypted MIB message that is transmitted over the PBCH. In one embodiment, the identifier of the encryption key and the encrypted broadcast message are transmitted on the same broadcast channel.

At step 730, the method 700 retrieves the encryption key using the identifier that is received at step 710. For example, a trusted endpoint device may store a set of encryption keys in a trusted platform module (TPM) which may be provided by a device manufacturer and/or cellular network provider. In addition, the set of encryption keys maybe a same set that is used by the base station to encrypt the broadcast message. Thus, the method 700 may access the set of encryption keys and retrieve the correct key associated with the identifier received at step 710.

At step 740, the method 700 decrypts the broadcast message that is encrypted with the encryption key. For example, the method may simply apply the encryption key to decipher the encrypted message. However, in one example the broadcast message that is encrypted may be encrypted as a spread-spectrum stream. For example, the encryption key may have been used as a spreading sequence by the base station. As such, in one embodiment step 740 may comprise de-spreading/descrambling the message where the encryption key comprises a scrambling/descrambling sequence.

Following step 740, the method may proceed to step 795 where the method ends, or may proceed to optional step 750. At optional step 750, the method 700 may retrieve a resource block assignment of a control channel from the broadcast message that is decrypted. For example, as mentioned above various aspects of control information may be contained in broadcast messages such as the MIB, SIB-1, SIB-2, etc. Control channels may also comprise other channels that are not "broadcast channels" such as uplink control channels. In any case, the control information contained in the broadcast message may include resource block assignments of any one or more of such additional control channels, e.g., the physical random access channel (PRACH), the physical uplink control channel (PUCCH) and so forth.

At optional step 760, the method 700 may receive a new identifier of a new encryption key when a communication impairment is detected at the base station. For example, as mentioned above, when a communication impairment is detected at the base station, the base station may switch to a new encryption key and transmit a new identifier to notify trusted endpoint devices of the change.

At optional step 770, the method 700 may retrieve the new encryption key using the new identifier. For example, step 770 may comprise substantially the same operations described above in connection with step 730, only with respect to the new identifier and the new encryption key.

At optional step 780, the method may decrypt a new broadcast message that is encrypted using the new encryption key. For example, step 780 may comprise substantially the same operations described above in connection with step 740 only with respect to the new broadcast message that is only decipherable with the new key.

At optional step 790, the method 700 may retrieve a new resource block assignment of the control channel from the new broadcast message. For example, as mentioned above the base station may change the resource block assignment(s) of a control channels to thwart attackers from making targeted "smart" radio jamming attacks on the frequencies/sub-carriers associated with the control channel. Thus, if the base station determines that an encryption key appears to have been compromised, or that an attacker may have otherwise deduced the resource block assignments of a control channel, the base station may switch to a new encryption key and also change the resource block assignments. Thus, any control channel configuration information an attacker may have previously gained is no longer useful. On the other hand, an endpoint device that has the new key may track the changes to the control channel configurations to enable continuity of service.

Following any of steps 750-790, the method 700 proceeds to step 795 where the method ends.

In addition, although not specifically specified, one or more steps, functions or operations of the respective methods 600 and 700 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIGS. 6 and 7 that recite a determining operation or involve a decision do not necessarily require that both branches of the determining operation be practiced. In other words, one of the branches of the determining operation can be deemed as an optional step. Furthermore, steps, blocks, functions or operations of the above described methods can be combined, separated, and/or performed in a different order from that described above, without departing from the example embodiments of the present disclosure.

Figure 8:
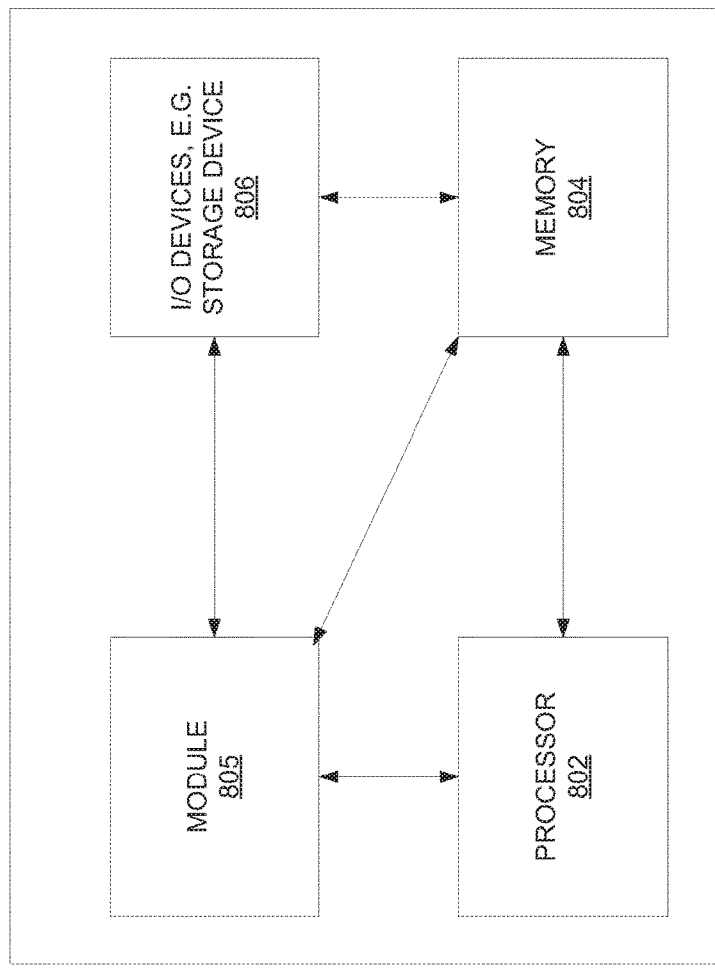
FIG. 8 illustrates a high-level block diagram of a general-purpose computer suitable for use in performing the functions, methods and algorithms described herein.

FIG. 8 depicts a high-level block diagram of a general-purpose computer suitable for use in performing the functions described herein. As depicted in FIG. 8, the system 800 comprises one or more hardware processor elements 802 (e.g., a central processing unit (CPU), a microprocessor, or a multi-core processor), a memory 804, e.g., random access memory (RAM) and/or read only memory (ROM), a module 805 for encrypting and/or decrypting a broadcast message, and various input/output devices 806 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer-readable instructions pertaining to the method(s) discussed above can be used to configure a hardware processor to perform the steps, functions and/or operations of the above disclosed methods. In one embodiment, instructions and data for the present module or process 805 for encrypting and/or decrypting a broadcast message (e.g., a software program comprising computer-executable instructions) can be loaded into memory 804 and executed by hardware processor element 802 to implement the steps, functions or operations as discussed above in connection with the exemplary methods 600 and 700. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 805 for encrypting and/or decrypting a broadcast message (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for encrypting a broadcast message of a base station, the method comprising:
   detecting, by a processor of the base station, a communication impairment at the base station, wherein the communication impairment pertains to a communication between the base station and an endpoint device;
   selecting, by the processor of the base station, in response to the detecting the communication impairment, an encryption key for the broadcast message;
   encrypting, by the processor of the base station, the broadcast message using the encryption key to create an encrypted broadcast message;
   transmitting, by the processor of the base station, an identifier of the encryption key;
   transmitting, by the processor of the base station, the encrypted broadcast message over a control channel via a first resource block, wherein the broadcast message includes information identifying that the control channel is to be reassigned from the first resource block to a second resource block; and
   reassigning, by the processor of the base station, the control channel of the base station from the first resource block to the second resource block.

2. The method of claim 1, wherein the base station comprises one of: a NodeB or an eNodeB.

3. The method of claim 1, wherein the identifier of the encryption key is transmitted unencrypted.

4. The method of claim 1, wherein the identifier of the encryption key is transmitted over the control channel.

5. The method of claim 1, wherein the control channel comprises a long term evolution control channel.

6. The method of claim 1, wherein the broadcast message comprises a master information block.

7. The method of claim 1, wherein the broadcast message comprises a system information block.

8. The method of claim 1, wherein the control channel comprises a plurality of orthogonal frequency division multiple access physical resource blocks, wherein the plurality of orthogonal frequency division multiple access physical resource blocks comprises the first resource block and the second resource block.

9. The method of claim 1, wherein the encryption key comprises a spreading sequence.

10. The method of claim 9, wherein the encrypting the broadcast message using the encryption key to create an encrypted broadcast message comprises spreading the broadcast message over a frequency band using the encryption key.

11. A computer-readable storage device storing instructions which, when executed by a processor of a base station, cause the processor to perform operations for encrypting a broadcast message of the base station, the operations comprising:
    detecting a communication impairment at the base station, wherein the communication impairment pertains to a communication between the base station and an endpoint device;
    selecting, in response to the detecting the communication impairment, an encryption key for the broadcast message;
    encrypting the broadcast message using the encryption key to create an encrypted broadcast message;
    transmitting an identifier of the encryption key;
    transmitting the encrypted broadcast message over a control channel via a first resource block, wherein the broadcast message includes information identifying that the control channel is to be reassigned from the first resource block to a second resource block; and
    reassigning the control channel of the base station from the first resource block to the second resource block.

12. The computer-readable storage device of claim 11, wherein the control channel comprises a plurality of orthogonal frequency division multiple access physical resource blocks, wherein the plurality of orthogonal frequency division multiple access physical resource blocks comprises the first resource block and the second resource block.

13. A method for decrypting a broadcast message of a base station that is encrypted, the method comprising:
    receiving, by a processor of an endpoint device, an identifier of an encryption key for the broadcast message;
    receiving, by the processor, the broadcast message that is encrypted, wherein the broadcast message is encrypted with the encryption key, wherein the broadcast message that is encrypted is received over a control channel from the base station via a first resource block, wherein the broadcast message includes information identifying that a reassigning of the control channel to a second resource block is to be performed, the information identifying the reassigning that is to be performed in response to detection of a communication impairment at the base station, wherein the communication impairment pertains to a communication between the base station and the endpoint device;
    retrieving, by the processor, the encryption key using the identifier of the encryption key;
    decrypting, by the processor, the broadcast message that is encrypted using the encryption key;
    retrieving, by the processor from the broadcast message, the information identifying that the control channel is to be reassigned to the second resource block; and
    accessing, by the processor, control information from the control channel via the second resource block.

14. The method of claim 13, wherein the endpoint device stores a plurality of encryption keys, wherein the encryption key for the broadcast message is selected from one of the plurality of encryption keys.

15. The method of claim 14, wherein the plurality of encryption keys is not accessible from a user space of the endpoint device.

16. The computer-readable storage device of claim 11, wherein the base station comprises one of: a NodeB or an eNodeB.

17. The computer-readable storage device of claim 11, wherein the identifier of the encryption key is transmitted unencrypted.

18. The computer-readable storage device of claim 11, wherein the identifier of the encryption key is transmitted over the control channel.

19. The computer-readable storage device of claim 11, wherein the control channel comprises a long term evolution control channel.

20. The computer-readable storage device of claim 11, wherein the broadcast message comprises a master information block.

* * * * *